(12) United States Patent
Choi et al.

(10) Patent No.: US 10,903,529 B2
(45) Date of Patent: Jan. 26, 2021

(54) BATTERY CELL COMPRISING INSULATOR ASSEMBLY FOR PREVENTING SHORT CIRCUIT CAUSED BY NAIL

(71) Applicant: LG CHEM, LTD., Seoul (KR)

(72) Inventors: Jung Seok Choi, Daejeon (KR); Seok Koo Kim, Daejeon (KR); Jong Keon Yoon, Daejeon (KR)

(73) Assignee: LG Chem, Ltd.

( * ) Notice: Subject to any disclaimer, the term of this patent is extended or adjusted under 35 U.S.C. 154(b) by 324 days.

(21) Appl. No.: 15/772,638

(22) PCT Filed: Aug. 11, 2017

(86) PCT No.: PCT/KR2017/008727
§ 371 (c)(1),
(2) Date: May 1, 2018

(87) PCT Pub. No.: WO2018/034463
PCT Pub. Date: Feb. 22, 2018

(65) Prior Publication Data
US 2020/0194847 A1    Jun. 18, 2020

(30) Foreign Application Priority Data
Aug. 17, 2016 (KR) .................. 10-2016-0104552

(51) Int. Cl.
*H01M 10/42* (2006.01)
*H01M 2/34* (2006.01)
*H01M 4/76* (2006.01)

(52) U.S. Cl.
CPC ......... *H01M 10/4235* (2013.01); *H01M 2/34* (2013.01); *H01M 4/76* (2013.01)

(58) Field of Classification Search
CPC ....... H01M 10/4235; H01M 2/34; H01M 4/76
See application file for complete search history.

(56) References Cited

U.S. PATENT DOCUMENTS

| 8,986,871 | B2 | 3/2015 | Kim et al. |
| 9,105,930 | B2 | 8/2015 | Yang |
| 2005/0123827 | A1 | 6/2005 | Kang et al. |
| 2013/0193927 | A1 | 8/2013 | Schaefer |

(Continued)

FOREIGN PATENT DOCUMENTS

| EP | 0851525 A1 | 7/1998 |
| JP | 2015-53134 A | 3/2015 |

(Continued)

OTHER PUBLICATIONS

International Search Report (PCT/ISA/210) issued in PCT/KR2017/008727, dated Dec. 11, 2017.

*Primary Examiner* — Victoria H Lynch
(74) *Attorney, Agent, or Firm* — Lerner, David, Littenberg, Krumholz & Mentlik, LLP

(57) ABSTRACT

Disclosed herein is a battery cell including an insulator assembly, wherein, when a needle-shaped conductor passes through the insulator assembly, a part of the insulator assembly into which a needle-shaped end part of the needle-shaped conductor is inserted is fallen and pass through the electrode assembly together with the needle-shaped conductor, and a planar shape of a through-hole of the electrode assembly is determined by the fell-off part of the insulator assembly.

15 Claims, 4 Drawing Sheets

(56) References Cited

U.S. PATENT DOCUMENTS

| | | |
|---|---|---|
| 2014/0141295 A1 | 5/2014 | Guen et al. |
| 2014/0162102 A1 | 6/2014 | Kim et al. |
| 2015/0311491 A1 | 10/2015 | Deschamps |
| 2018/0254508 A1* | 9/2018 | Kim .................... H01M 2/0202 |

FOREIGN PATENT DOCUMENTS

| | | |
|---|---|---|
| KR | 10-2013-0033551 A | 4/2013 |
| KR | 10-2014-0065956 A | 5/2014 |
| KR | 10-1533993 B1 | 7/2015 |
| KR | 10-2015-0092572 A | 8/2015 |
| KR | 10-2016-0004737 A | 1/2016 |
| KR | 10-2016-0084817 A | 7/2016 |
| KR | 10-2016-0089153 A | 7/2016 |
| KR | 10-2017-0050188 A | 5/2017 |

* cited by examiner

BATTERY CELL COMPRISING INSULATOR ASSEMBLY FOR PREVENTING SHORT CIRCUIT CAUSED BY NAIL

TECHNICAL FIELD

The present disclosure relates to a battery cell including an insulator assembly for preventing a short circuit caused by a nail.

BACKGROUND ART

As mobile devices have been increasingly developed and the demand for such mobile devices has increased, the demand for secondary batteries as energy sources for mobile devices has also sharply increased. Accordingly, much research into secondary batteries (or "battery cells") satisfying various needs has been carried out.

Battery cells may be classified on the basis of the shape of a battery case into a cylindrical battery configured to have a structure in which an electrode assembly is mounted in a cylindrical metal container, a prismatic battery configured to have a structure in which an electrode assembly is mounted in a prismatic metal container, and a pouch-shaped battery configured to have a structure in which an electrode assembly is mounted in a pouch-shaped case made of a laminated aluminum sheet.

In addition, battery cells may be classified on the basis of a structure of an electrode assembly including a positive electrode, a negative electrode, and a separator. For example, the electrode assembly may be configured to have a jelly-roll (wound) type structure in which long-sheet type positive electrodes and negative electrodes are wound while separators are disposed between the positive electrodes and the negative electrodes, a stacked type structure in which pluralities of positive electrodes and negative electrodes that each have a predetermined size are sequentially stacked while separators are disposed between the positive electrodes and the negative electrodes, a stacked/folded type structure in which pluralities of positive electrodes and negative electrodes that each have a predetermined size are sequentially stacked while separators are disposed between the positive electrodes and the negative electrodes, to constitute a unit cell, such as a bi-cell or a full cell, and then unit cells are wound in a state in which the unit cells are disposed on a separation film or another stacked type electrode assembly in which bi-cells or full cells are stacked in a state in which separators are disposed between the bi-cells or the full cells.

Recently, a lot of interest has been directed at a battery cell including an electrode assembly that includes bi-cells or full cells, which are easy to manufacture, have a low manufacturing cost, and have high structural applicability in response to various shapes of a device in which the battery cell is mounted.

Meanwhile, in a case in which a sharp needle-shaped conductor, such as a nail, having high electrical conductivity penetrates into an electrode assembly, a positive electrode and a negative electrode of the electrode assembly are electrically connected to each other by the needle-shaped conductor such that that a current flows to the needle-shaped conductor which has a low resistance. At this time, the electrodes which the needle-shaped conductor penetrated are deformed, and high resistance heat is generated due to a current being conducted in a contact resistance portion between a positive electrode active material and a negative electrode active material. In a case in which a temperature in the electrode assembly exceeds a critical temperature level due to the resistance heat, an oxide structure of the positive electrode active material collapses, and therefore a thermal runaway phenomenon occurs. As a result, the electrode assembly and the battery cell may catch fire or explode.

In addition, in a case in which the electrode active material or a current collector bent by the needle-shaped conductor comes into contact with an opposite electrode that the electrode active material or the current collector faces, the thermal runaway phenomenon may be further accelerated. These problems may be more serious in a bi-cell including a plurality of electrodes and an electrode assembly including the same.

Therefore, a battery cell with a structure that improves safety by preventing a short circuit, ignition, explosion, and the like is in demand.

DISCLOSURE

Technical Problem

The present disclosure is provided to solve the above technical problems of the related art.

In particular, it is an object of the present disclosure to provide a battery cell including an insulator assembly for preventing a short circuit caused by a nail.

Technical Solution

According to a first aspect of the present disclosure, there is a provided a battery cell including an electrode assembly, an electrolytic solution and a cell case, wherein an insulator assembly with electrical insulation is attached to at least outer side of at least one surface of both surfaces of the electrode assembly in a lamination direction of the electrodes; and when a needle-shaped conductor passes through the insulator assembly, a part of the insulator assembly into which a needle-shaped end part of the needle-shaped conductor is inserted may be fallen and pass through the electrode assembly together with the needle-shaped conductor, and a planar shape of a through-hole of the electrode assembly is determined by the fell-off part of the insulator assembly.

In particular, in the battery cell according to the present disclosure, when the needle-shaped conductor passes through the insulator assembly, the fell-off part of the insulator assembly instead of the needle-shaped conductor may determine the shape of the through-hole of the electrode assembly, so that a possibility that the needle-shaped conductor is in contact with the electrode inside the electrode assembly in the through-hole can be remarkably reduced.

Therefore, in the present disclosure, the planar area of the fell-off part of the insulator assembly may be configured to be larger than the largest vertical cross-sectional area of the needle-shaped conductor, so that the fell-off part of the insulator assembly has a larger through-hole than the vertical cross-sectional area of the needle-shaped conductor.

The needle-shaped conductors defined in the present disclosure can be understood as sharp and long-shaped members such as nails, screws, bolts, and the like.

Hereinafter, assuming a nail having a sharp end as an example of the needle-shaped conductors, the concrete structure and working structure of the insulator assembly will be described in detail.

In an exemplary embodiment, the insulator assembly may have a structure in which two or more insulators are laminated. The insulator assembly may have a single insulator or a structure in which two or more insulators are laminated; and the insulator may have a structure including an insulating main body and a plurality of fell-off patterns formed on the insulating main body.

The insulating main body may be one or more kinds selected from the group consisting of polyimide, silicone, Teflon, aramid fiber, glass fiber, ultra-high molecular-weight polyethylene (UHMWPE) fiber and polybenzoxazole (PBO) fiber that have excellent insulating properties.

In the insulating assembly, two or more insulators may have a structure in which the fell-off part patterns formed in each insulator are laminated so as not to overlap each other.

The laminated structure can minimize a formation of a blind spot for a penetration of needle-shaped conductors because the fell-off part patterns can be arranged relatively closely on a plane.

In contrast, a single insulator may have a relatively thin thickness, which is advantageous in terms of thickness and volume of the battery cell.

Optionally, at least one surface of outer surfaces of the insulator may be coated with an insulating coating agent such as fluorine, enamel, silicone, and the like.

In the present disclosure, when the needle-shaped conductor passes through the fell-off pattern, the fell-off pattern may be fallen from the insulating main body and pass through the electrode assembly together with the needle-shaped conductor by the needle-shaped end part of the needle-shaped conductor inserted into the insulator assembly.

The fell-off pattern may include: a fell-off part made of metal, high-strength plastic or ceramic so as to have a tensile strength not to break when the electrode assembly passes through; and a needle-shaped conductor guiding part having a planar size of 50 to 80% of a planar size of the fell-off part in the vicinity of a center of the fell-off part, and when the needle-shaped conductor guiding part is fixed to the needle-shaped end part of the needle-shaped conductor, the fell-off part may pass through the electrode assembly in a penetrating direction along the needle-shaped conductor in a state of being fallen from the insulating main body.

In this way, when the needle-shaped conductor inevitably penetrates, the fell-off part fixed to the needle-shaped conductor other than the needle-shaped conductor passes through the electrode assembly, so that a phenomenon that the needle-shaped conductors are in direct contact with the electrodes can be suppressed.

In an exemplary embodiment, a total planar area of the fell-off part may be about 7 to 200 mm$^2$, more particularly about 20 to 95 mm$^2$, so that the fell-off part determines the planar shape and area of the through-hole formed in the electrode assembly.

The planar area is set considering a size of common nails, screws, bolts and the like in the related art. Since a diameter of general needle-shaped conductors is approximately 1 to 10 mm, the planar diameter of the through-hole formed by the fell-off part which has a larger planar area than a vertical cross-sectional area of the general needle-shaped conductor is larger than a diameter of the general needle-shaped conductors, and a possibility that the needle-shaped conductors is in contact with the electrodes in the through-hole is significantly lowered.

In order to pass through the electrode assembly, the fell-off part should have a strength not to break during penetration. For this purpose, a tensile strength of the fell-off part may be 1 to 10 kg/cm.

In the present disclosure, the high-strength plastic may be one kind selected from the group consisting of polyamide, polyacetyl, polycarbonate, polyester resin, polyphenylene oxide, polyolefin, polyimide, silicone, Teflon, aramid fiber, glass fiber, ultra-high molecular-weight polyethylene (UHMWPE) fiber and polybenzoxazole (PBO) fiber.

Optionally, the insulating main body may also be made of the high-strength plastic.

The metal may be one or, two or more kinds of alloys selected from the group consisting of aluminum, copper, SUS, duranium, palladium, platinum, nickel and molybdenum, but is not limited thereto.

Optionally, the surface of the metal may be subjected to an organic insulating coating process, an inorganic insulating coating process, or an anodizing treatment process.

In an exemplary embodiment, the needle-shaped conductor guiding part may further include an insulating film which can be stretched along the needle-shaped end part of the needle-shaped conductor.

The insulating film is stretched in a form of wrapping around the needle-shaped conductor and the fell-off part by frictional force, thereby preventing direct contact between the needle-shaped conductor and the electrodes.

The thickness of the insulating film may be at least 15 micrometers or more, and more specifically, may be 20 micrometers. Considering the elongation of the insulating film, when the thickness of the insulating film is less than 15 micrometers, it is not preferable because it cannot be expected that the needle-shaped conductor and the fell-off part are wrapped around.

The insulating film may be an organic/inorganic composite porous safety-reinforcing separator (SRS).

The SRS separator does not thermally shrink at high temperature due to heat resistance of the inorganic particles. Even when the needle-shaped conductor penetrates into the electrode assembly, the elongation of the insulating film may be maintained.

The SRS separator may be configured such that an active layer, including inorganic particles and a binder polymer, is coated on a polyolefin-based separator substrate.

The SRS separator may have a pore structure included in the separator substrate and a uniform pore structure formed by the interstitial volume among inorganic particles as active layer ingredients. The pores may considerably reduce the magnitude of external impact applied to the electrode assembly. In addition, lithium ions may smoothly flow through the pores, and the pores may be filled with a large amount of electrolytic solution in order to increase an impregnation rate, thereby improving the performance of the battery. The pores formed in the polyolefin-based separator substrate and the active layer may exist in an anchoring state such that the separator substrate and the active layer are physically coupled to each other. In consideration of physical coupling force between the separator substrate and the active layer and the pore structure in the separator, a thickness ratio of the separator substrate to the active layer may be 9:1 to 1:9. Specifically, the thickness ratio of the separator substrate to the active layer may be 5:5.

In the SRS separator, one of the active layer ingredients formed in some pores of a surface and/or a substrate of the polyolefin-based separator substrate is inorganic particles which are conventionally known in the art.

The inorganic particles may form empty space among inorganic particles and thereby may form micro pores and maintain a physical shape as a spacer. In addition, physical characteristics of the inorganic particles are not generally changed at a temperature of 200° C. or more and, as such, a formed organic/inorganic composite porous film has excellent thermal resistance.

The inorganic particles are not particularly restricted so long as the inorganic particles are electrochemically stable. That is, the inorganic particles that can be used in the present invention are not particularly restricted so long as the inorganic particles are not oxidized and/or reduced within an operating voltage range (e.g. 0 to 5 V based on Li/Li+) of a battery to which inorganic particles are applied. In particular, in a case in which inorganic particles having ion transfer ability are used, it is possible to improve ion conductivity in an electrochemical element, thereby improving the performance of the battery. Consequently, it is preferable that ion conductivity of the inorganic particles be as high as possible. In addition, in a case in which the inorganic particles have high density, it may be difficult to disperse the inorganic particles at the time of coating, and the weight of the battery may increase. For these reasons, it is preferable that density of the inorganic particles be as low as possible. Additionally, in a case in which the inorganic particles have high permittivity, a degree of dissociation of electrolyte salt, such as lithium salt, in a liquid electrolyte may increase, thereby improving ion conductivity of the electrolytic solution.

Due to the reasons described above, the inorganic particles may be one or more kinds of inorganic particles selected from the group consisting of (a) inorganic particles having piezoelectricity and (b) inorganic particles having lithium ion transfer ability.

The inorganic particles having piezoelectricity mean a material which is a nonconductor at normal pressure but, when a certain pressure is applied thereto, an internal structure is changed and thereby has conductivity. In particular, the inorganic particles having piezoelectricity exhibit high dielectric constant characteristics having a dielectric constant of 100 or more and have a potential difference between both faces in which one face is charged by a positive electrode and the other face is charged by a negative electrode by electric charges generated when the inorganic particles are tensioned or compressed by a certain pressure.

In a case in which the inorganic particles having the above-mentioned characteristics are used as a porous active layer ingredient, a short-circuit may occur in the positive electrode and the negative electrode due to external impact, such as a needle-shaped conductor, whereby positive electrode and the negative electrode may not directly contact each other due to inorganic particles coated on a separator, and potential differences in particles may occur due to piezoelectricity of the inorganic particles. Accordingly, electron migration, namely, fine current flow, is achieved between both electrodes, whereby voltage of the battery is gradually reduced, and therefore stability may be improved.

The inorganic particles having piezoelectricity may be one or more kinds of inorganic particles selected from the group consisting of $BaTiO_3$, $Pb(Zr,Ti)O_3$ (PZT), $Pb_{1-x}La_xZr_{1-y}Ti_yO_3$(PLZT), $Pb(Mg_3Nb_{2/3})O_3$—$PbTiO_3$ (PMN-PT), and hafnia ($HfO_2$), but the present invention is not limited thereto.

The inorganic particles having lithium ion transfer ability indicate inorganic particles which contain lithium elements, do not save lithium, and transport lithium ions. The inorganic particles having lithium ion transfer ability may transfer and transport lithium ions by a defect present in a particle structure. Consequently, lithium ionic conductivity in a battery is improved, and therefore battery performance may be improved.

The inorganic particles having lithium ion transfer ability may be one or more kinds of inorganic particles selected from the group consisting of lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$-based glass (where $0<x<4$ and $0<y<13$), lithium lanthanum titanate ($Li_xTa_yTiO_3$, where $0<x<2$ and $0<y<3$), lithium germanium thio phosphate ($Li_xGe_yP_zS_w$, where $0<x<4$, $0<y<1$, $0<z<1$, and $0<w<5$), lithium nitride ($Li_xN_y$, where $0<x<4$ and $0<y<2$), $SiS_2$-based glass ($Li_xSi_yS_z$, where $0<x<3$, $0<y<2$, and $0<z<4$), and $P_2S_5$-based glass ($Li_xP_yS_z$, where $0<x<3$, $0<y<3$, and $0<z<7$), but the present invention is not limited thereto.

A composition ratio of the inorganic particles and the binder polymer, which constitute the active layer ingredient, is not greatly limited and may be controlled in a range of 10:90 to 99:1 wt %, preferably 80:20 to 99:1 wt %. In a case in which the composition ratio is less than 10:90 wt %, the amount of polymer is excessively increased and thereby pore sizes and porosity are reduced due to reduction of interstitial volume formed among inorganic particles, and, accordingly, final battery performance is deteriorated. On the contrary, in a case in which the composition ratio exceeds 99:1 wt %, the amount of a polymer is too low and thereby adhesive strength among inorganic matters is weakened, and, accordingly, the mechanical properties of a final organic/inorganic composite porous separator may be deteriorated.

The active layer of the organic/inorganic composite porous separator may include other conventionally known additives, in addition to the inorganic particles and the polymer described above.

In the organic/inorganic composite porous separator, the substrate coated with the mixture of the inorganic particles and the binder polymer as ingredients of the active layer may be, for example, a polyolefin-based separator conventionally used in the art. The polyolefin-based separator ingredient may be, for example, high-density polyethylene, linear low-density polyethylene, low-density polyethylene, ultra-high molecular weight polyethylene, polypropylene, derivatives thereof or the like.

Meanwhile, the fell-off part may be combined with the fell-off pattern and the insulating main body in a structure which is easy to be fallen from the insulating main body, and this will be described in detail with reference to the following non-limiting examples.

In an exemplary embodiment, the insulating main body may have an opening corresponding to the planar shape of the fell-off part, and the insulator may have a structure in which the insulating main body and the fell-off pattern are combined with each other in a manner that an adhesive is added to an interface between the insulating main body and the fell-off pattern in a state where the fell-off part is inserted into the opening.

In another exemplary embodiment, the insulating main body may have an opening corresponding to the planar shape of the fell-off part, and the insulator may have a structure in which the insulating main body and the fell-off pattern are combined with each other in a manner that the interfaces are fused with each other in a state where the fell-off part is inserted into the opening.

Unlike these embodiments, the insulator may have a structure in which the insulating main body and the fell-off pattern are integrated with each other in a manner that the insulating main body and the fell-off part are partitioned by a notch or perforation line.

The planar shape of the fell-off pattern is not particularly limited, and may be, for example, a circular shape, an elliptical shape, or a polygonal shape on a plane.

The present disclosure also provides a battery cell according to a second aspect of the present disclosure for achieving the above object.

In particular, the battery cell includes an electrode assembly, an electrolytic solution and a cell case, wherein an insulator assembly with electrical insulation is attached to at least one surface of the cell case; and when a needle-shaped conductor passes through the insulator assembly, a part of the insulator assembly may be fallen and pass through the cell case and the electrode assembly together with the needle-shaped conductor, and a planar shape of the through-hole formed on the electrode assembly is determined by the fell-off part of the insulator assembly.

Same as the first aspect, the battery cell also has a structure in which, when the needle-shaped conductor passes through the insulator assembly, the fell-off part of the insulator assembly determines the shape of the through-hole of the electrode assembly instead of the needle-shaped conductor, so that a possibility that the needle-shaped conductor is in contact with the electrode inside the electrode assembly in the through-hole can be remarkably reduced.

In an exemplary embodiment, the insulator assembly may be attached to at least one of inner surfaces and/or at least one of outer surfaces of the cell case.

A specific structure and working structure of the insulator assembly may be same as the first aspect.

In the present disclosure, a type of the battery cell is not particularly limited, but specific examples thereof may include a lithium secondary battery such as a lithium-ion secondary battery, a lithium polymer secondary battery or a lithium-ion polymer secondary battery having high energy density, high discharge voltage and high output stability.

Generally, the lithium secondary battery includes a positive electrode, a negative electrode, a separator, and a non-aqueous electrolytic solution containing a lithium salt.

The positive electrode may be manufactured, for example, by applying a mixture of a positive electrode active material, a conductive material and a binder to a positive electrode current collector and/or extended current collect part and then drying the applied mixture. A filler may be further added to the mixture as needed.

The positive electrode current collector and/or extended current collect part may be generally manufactured to a thickness of about 3 to 500 μm. For the positive electrode current collector and/or the extended current collect part, a material not inducing the chemical change and having a high conductivity may be used without limitation. For example, stainless steel, aluminum, nickel, titanium, calcined carbon, a surface treated material of aluminum or stainless steel with carbon, nickel, titanium, silver, or the like may be typically used. To increase the adhesiveness of the positive electrode active material, minute embossing may be formed on the surface of the positive electrode current collector and/or the extended current collect part. In addition, the positive electrode current collector may have various shapes such as a film, a sheet, a foil, a net, a porous body, a foamed body, a non-woven fabric, etc.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co. Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in the battery to which it is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber, metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in the battery to which it is applied and is made of a fibrous material. As examples of the filler, there may be used olefin polymers, such as polyethylene and polypropylene; and fibrous materials, such as glass fiber and carbon fiber.

The negative electrode may be manufactured by applying and drying a negative electrode active material to a negative electrode current collector and/or extended current collect part. The above-described components may be selectively added to the negative electrode active material as needed.

The negative electrode current collector and/or extended current collect part may be generally manufactured to a thickness of about 3 to 500 μm. For the negative electrode current collector and/or the extended current collect part, a material not inducing chemical change and having conductivity may be used without limitation. For example, copper, stainless steel, aluminum, nickel, titanium, calcined carbon, a surface treated material of copper or stainless steel with carbon, nickel, titanium, silver, an aluminum-cadmium alloy, etc. may be used. Also, Further, same as the positive electrode current collector, to increase the adhesiveness of the negative electrode active material, minute embossing may be formed on the surface of the negative electrode current collector, and the negative electrode current collector may have various shapes such as a film, a sheet, a foil, a net, a porous body, a foamed body, a non-woven fabric, etc.

As the negative electrode active material, for example, there may be used carbon, such as non-graphitizing carbon or a graphite-based carbon; a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \le x \le 1$; $1 \le y \le 3$; $1 \le z \le 8$); lithium metal; lithium alloy; silicon-based alloy, tin-based alloy, metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is disposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may function as the separator.

The electrolytic solution may be a non-aqueous electrolytic solution containing a lithium salt, and may be composed of a non-aqueous electrolytic solution and a lithium salt. As the non-aqueous electrolytic solution, a non-aqueous organic solvent, an organic solid electrolyte or an inorganic solid electrolyte may be used, but not limited thereto.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}C_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, and etc. may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas, fluoro-ethylene carbonate (FEC), propene sultone (PRS) and etc.

In an exemplary embodiment, the lithium salt such as $LiPF_6$, $LiClO_4$, $LiBF_4$, $LiN(SO_2CF_3)_2$ may be added to a mixed solvent of a cyclic carbonate of EC or PC which is a high-dielectric solvent and a linear carbonate of DEC, DMC or EMC which is a low viscosity solvent to manufacture a non-aqueous electrolyte containing a lithium salt.

Advantageous Effects

As described above, a battery cell according to the present disclosure is configured that when a needle-shaped conductor passes through an insulator assembly, a fell-off part of the insulator assembly, instead of the needle-shaped conductor, determines a shape of a through-hole of an electrode assembly, so that a possibility that the needle-shaped conductor is in contact with an electrode inside the electrode assembly in the through-hole is low.

DETAILED DESCRIPTION OF THE PREFERRED EMBODIMENTS

Hereinafter, embodiments of the present disclosure will be described with reference to the accompanying drawings. However, the description provided herein is for a better understanding of the present disclosure, and the scope of the present disclosure is not limited thereto.

Figure 1:
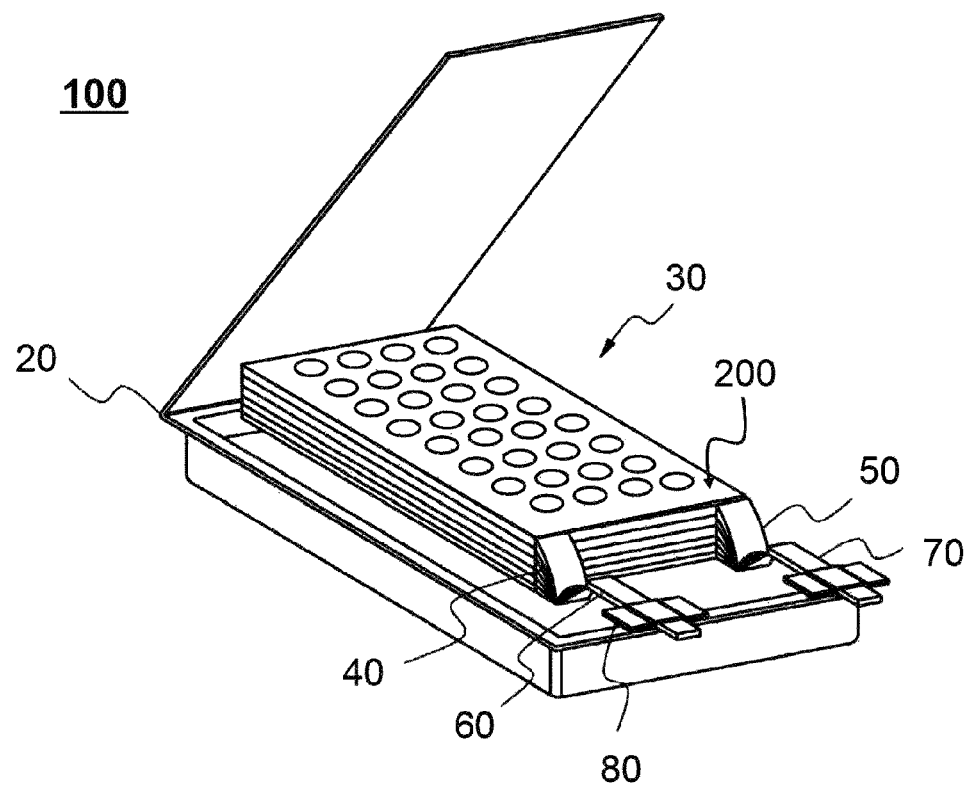
FIG. 1 and FIG. 2 are schematic views of a battery cell according to an exemplary embodiment of the present disclosure.
Figure 2:
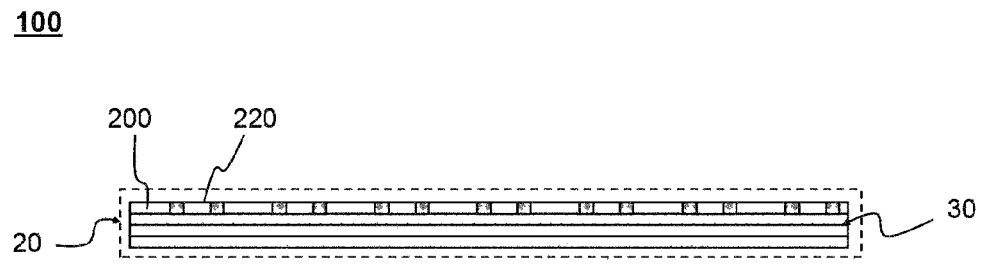
Figure 3:
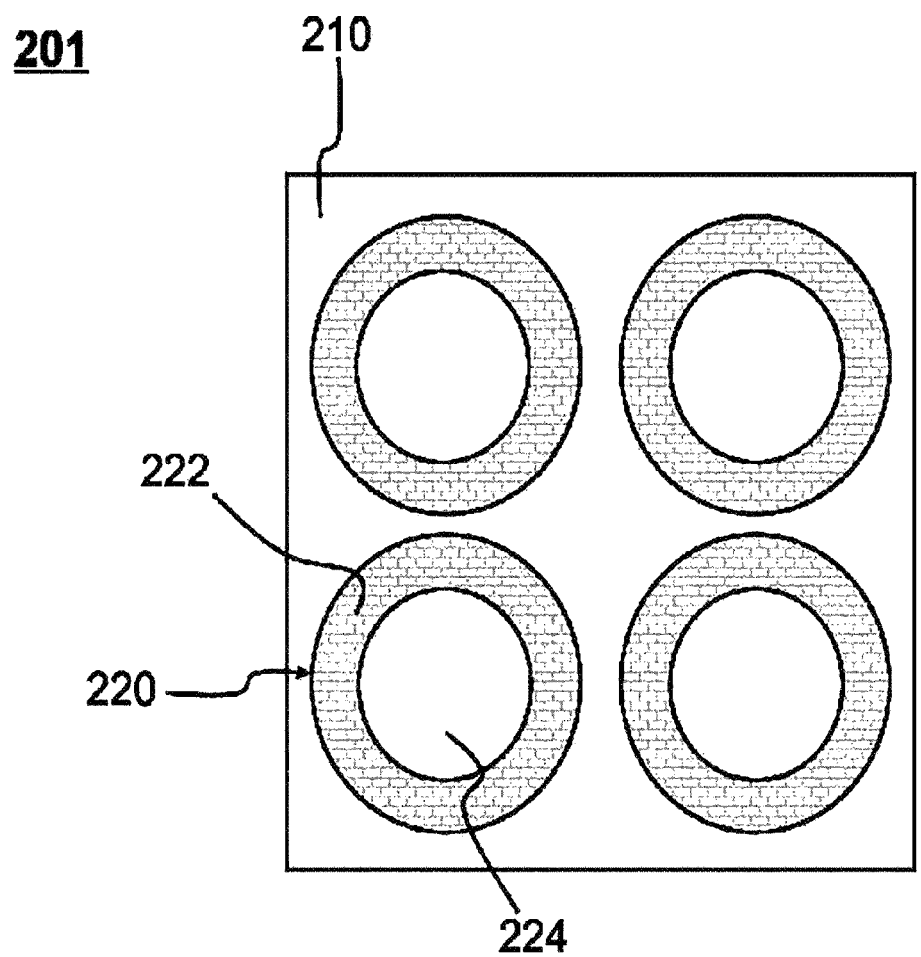
FIG. 3 is a partial schematic view of an insulator constituting an insulator assembly according to an exemplary embodiment of the present disclosure.

FIG. 1 is a schematic view of a battery cell 100 according to an exemplary embodiment of the present disclosure, FIG. 2 is a vertical sectional view of a side surface of the battery cell 100, and FIG. 3 is a schematic view of an insulator assembly 200.

Referring to FIG. 1, the battery cell 100 has a structure in which an electrode assembly 30 including a positive electrode, a negative electrode, and a separator disposed therebetween is embedded in a pouch-shaped cell case 20 together with an electrolyte solution, and an outer periphery thereof which is an outer end part of the cell case 20, is sealed in a state in which electrode leads 60 and 70 coupled to electrode tabs 40 and 50 of the electrode assembly 30 protrude outside the cell case 20.

In addition, the insulator assembly 200 with electrical insulation is provided on an outer side of an upper surface of the electrode assembly 30 in a lamination direction of the electrodes.

The insulator assembly 200 shown in FIG. 3 includes one insulator 201 including an insulating main body 210, and a plurality of fell-off pattern 220 formed on the insulating main body 210.

The fell-off pattern 220 includes a fell-off part 222 made of metal, high-strength plastic, or ceramic to have a hardness not to break when the electrode assembly 30 passes therethrough, and a needle-shaped conductor guiding part 224 having a planar size of 70% of a planar size of the fell-off part 222 in the vicinity of a center of the fell-off part 222.

In particular, the insulating main body 210 have an opening corresponding to a planar shape of the fell-off part 222, and the insulating main body 210 and the fell-off pattern 220 are combined in a manner in which an adhesive is added to an interface between the insulating main body and the fell-off pattern in a state in which the fell-off part 222 is inserted into the opening of the insulating main body 210.

Therefore, when an external force greater than an adhesive force of the adhesive is applied to the fell-off part 222, the fell-off part 222 may be fallen from the insulating main body 210.

While not shown in the drawings, alternatively, the insulating main body 210 and the fell-off pattern 220 may be combined in a manner in which the interface is fused instead of the adhesive in a state in which the fell-off part 222 is inserted into the opening.

The fusing may be fusing by heat, fusing by welding, fusing by soldering, and the like, but is not limited thereto.

A total planar area of the fell-off pattern, that is, the sum of the areas of the fell-off part 222 and the needle-shaped conductor guiding part 224 on a plane may be about 30 mm$^2$, and the area of the needle-shaped conductor guiding part 224 on the plane may be configured to be about 200 mm$^2$. In this structure, when a needle-shaped conductor 1 having a diameter of about 5 mm passes through the needle-shaped conductor guiding part 224 and penetrates the battery cell 100, the needle-shaped conductor guiding part 224 is fixed to a needle-shaped end part of the needle-shaped conductor 1, and then the fell-off part 222, which is in a state of being fallen from the insulating main body 210, passes through the electrode assembly 30 in a penetrating direction along the needle-shaped conductor 1.

For reference, the total area of the fell-off pattern 220 and the planar area of the needle-shaped conductor guiding part 224 are set under the assumption that the diameter is 5 mm, which is a general diameter of a nail. The scope of the present disclosure is not limited to the above numerical values, and a size and shape of the fell-off pattern 220 can be variously configured to prepare for various needle-shaped conductors 1.

Therefore, the fell-off part 222 fixed to the needle-shaped conductor 1, not the needle-shaped conductor 1, penetrates the battery cell 100, and accordingly, the fell-off part 222 having a larger planar area than that of the needle-shaped conductor 1 determines a shape of a through-hole 2 of the electrode assembly 30, and the through-hole 2 has a larger planar area than that of the needle-shaped conductor 1. Accordingly, a space is formed between the needle-shaped conductor 1 and an inner surface of the through-hole 2, that is, between the electrodes, so that a possibility of the needle-shaped conductor 1 coming into contact with the electrode can be remarkably reduced.

Figure 4:
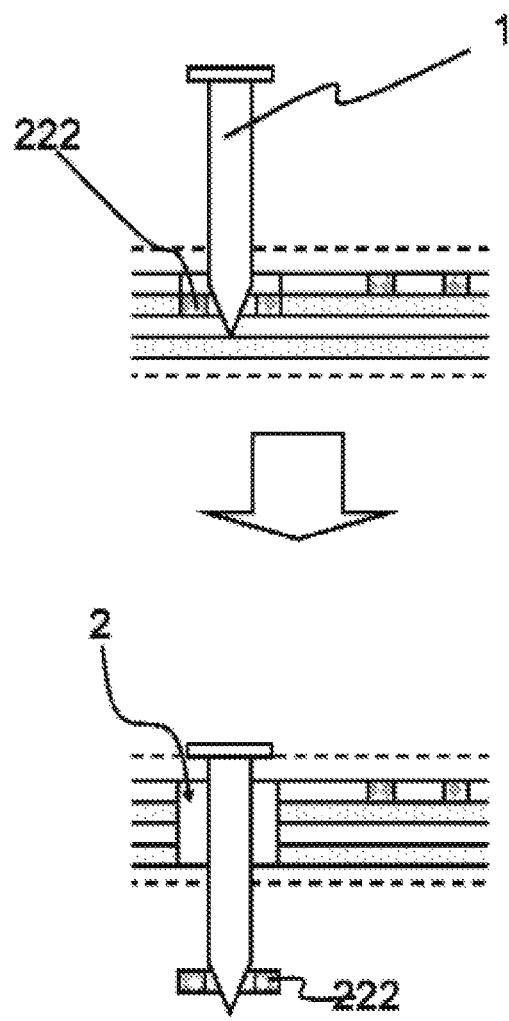
FIG. 4 is a schematic view showing a process in which a fell-off pattern acts in an insulator assembly due to penetration of a needle-shaped conductor.

This is illustrated in more detail in FIG. 4. FIG. 4 schematically shows a process in which the fell-off pattern 220 acts in the insulator assembly 200 due to penetration of the needle-shaped conductor 1.

Referring to FIG. 4, after the needle-shaped conductor 1 first passes through the battery case of the battery cell 100, the needle-shaped end part of the needle-shaped conductor 1 is inserted into the needle-shaped conductor guiding part 224. However, the diameter of the needle-shaped conductor 1 is larger than that of the needle-shaped conductor guiding part 224, and thus the needle-shaped conductor 1 is fixed in the needle-shaped conductor guiding part 224.

When the needle-shaped conductor 1 continues to move in this state, the fell-off part 222 is fallen from the insulating main body 210.

Since the fell-off part 222 has a larger planar area than that of the needle-shaped conductor 1, the fell-off part 222 fixed to the needle-shaped end part of the needle-shaped conductor 1 sequentially passes through the electrodes of the electrode assembly 30.

Therefore, the needle-shaped conductor 1, which has a small size relative to the size of the through-hole 2, does not come into direct contact with the electrodes.

As described above, in the present disclosure, since the insulating assembly for preparing for penetration of the needle-shaped conductor 1 is provided on an outer surface of the electrode assembly 30, stability of the battery cell 100 relative to the needle-shaped conductor 1 can be greatly improved.

Meanwhile, while not shown in the drawings, the needle-shaped conductor guiding part 224 may have a structure in which the fell-off part 222 is simply perforated, or a structure in which an insulating film having high elongation is provided in the perforated state.

Figure 5:
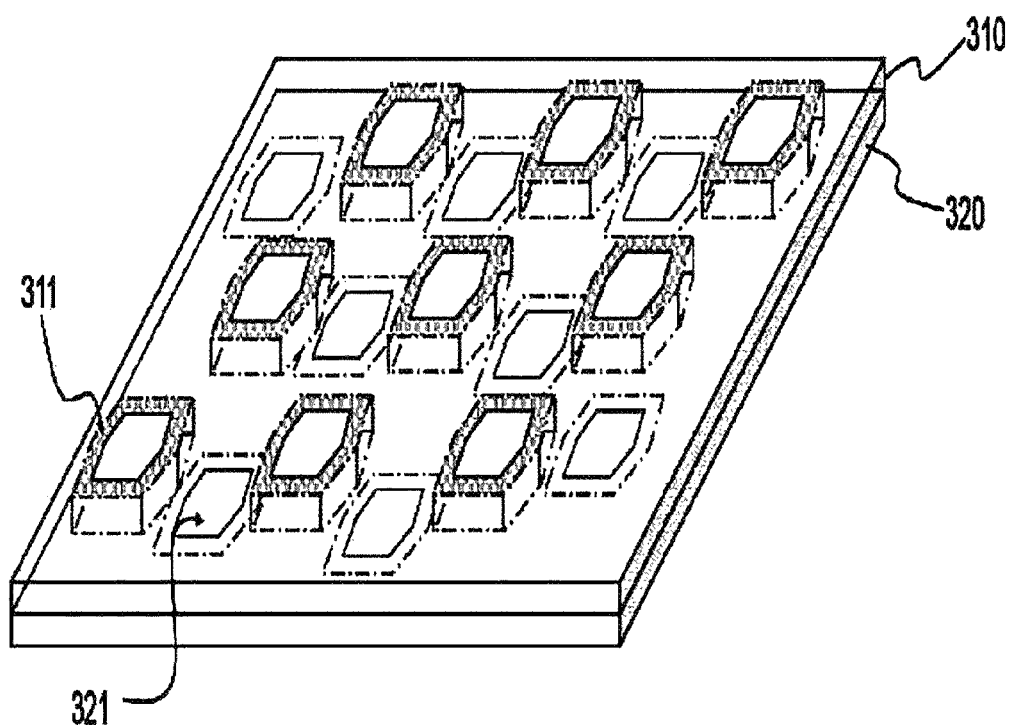
FIG. 5 is a schematic view of an insulator assembly according to another exemplary embodiment of the present disclosure.

Referring to FIG. 5, an insulator assembly 300 has a structure in which a first insulator 310 and a second insulator 320 are laminated.

In the first insulator 310, hexagonal fell-off patterns 311 in a plane are formed on an insulating main body in a state of being spaced apart at regular intervals.

In the second insulator 320, hexagonal fell-off patterns 321 are formed on an insulating main body at a position that does not overlap with the fell-off patterns 311 of the first insulator 310 in a plane.

Therefore, in the insulator assembly 300, two or more insulators are laminated in a manner in which the fell-off patterns 311 and 321 respectively formed in the insulators 310 and 320 do not overlap.

In this structure, the fell-off patterns 311 and 321 are arranged relatively closely in a plane so that formation of a blind spot during penetration of a needle-shaped conductor can be minimized.

Figure 6:
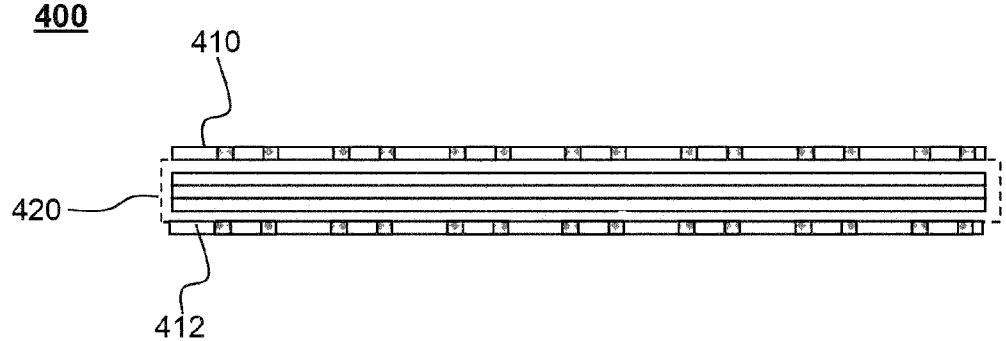
FIG. 6 is a schematic view of a battery cell according to another exemplary embodiment of the present disclosure.

FIG. 6 is a schematic view of a battery cell according to another exemplary embodiment of the present disclosure.

A basic structure of a battery cell 400 shown in FIG. 6, that is, an electrode assembly, a battery case, and the like, is identical to that of the battery cell 100 shown in FIGS. 1 to 4, but insulator assemblies 410 and 412 are attached to upper and lower surfaces of a battery case 420 and not an outer surface of an electrode assembly thereof.

However, the specific structure and working structure of each of the insulator assemblies 410 and 412 are identical to those of the insulator assembly 200 shown in FIGS. 1 to 4 or the insulator assembly 300 shown in FIG. 5.

Those skilled in the art should appreciate that various modifications, additions, and substitutions of the above-described embodiments are possible without departing from the scope and spirit of the present disclosure as disclosed in the accompanying claims.

The invention claimed is:

1. A battery cell including an electrode assembly, an electrolyte solution and a cell case, comprising:
   an insulator assembly with electrical insulation attached to an outer side of at least one of both surfaces of the electrode assembly in a lamination direction of electrodes, the insulator assembly having a single insulator or a structure in which two or more insulators are laminated, the insulator having a structure including an insulating main body and a plurality of fall-off patterns formed on the insulating main body, and
   wherein when a needle-shaped conductor passes through the insulator assembly, a part of the insulator assembly into which a needle-shaped end part of the needle-shaped conductor is inserted falls and passes through the electrode assembly together with the needle-shaped conductor, and a planar shape of a through-hole of the electrode assembly is determined by a fall-off part of the insulator assembly.

2. The battery cell according to claim 1, wherein, in the insulator assembly, the two or more insulators have a structure in which the plurality of fall-off patterns formed in each insulator are laminated so as not to overlap each other.

3. The battery cell according to claim 1, wherein when the needle-shaped conductor passes through a fall-off pattern, the fall-off pattern falls from the insulating main body and passes through the electrode assembly together with the needle-shaped conductor by the needle-shaped end part of the needle-shaped conductor inserted into the insulator assembly.

4. The battery cell according to claim 3, wherein the fall-off pattern includes:
   the fall-off part made of metal, high-strength plastic or ceramic so as to have a tensile strength not to break when the electrode assembly passes through; and
   a needle-shaped conductor guiding part having a planar size of 50 to 80% of a planar size of the fall-off part in the vicinity of a center of the fall-off part, and
   wherein when the needle-shaped conductor guiding part is fixed to the needle-shaped end part of the needle-shaped conductor, the fall-off part passes through the electrode assembly in a penetrating direction along the needle-shaped conductor in a state of being fallen from the insulating main body.

5. The battery cell according to claim 4, wherein a total planar area of the fall-off part is in a range of about 7 to 200 mm2 so that the fall-off pattern determines a planar shape and area of the through-hole formed in the electrode assembly.

6. The battery cell according to claim 4, wherein a total planar area of the fall-off pattern is in a range of about 20 to 95 mm2.

7. The battery cell according to claim 4, wherein the tensile strength of the fall-off part is in a range of about 1 to 10 kg/cm.

8. The battery cell according to claim 4, wherein the high-strength plastic is one kind selected: from the group consisting of polyamide, polyacetyl, polycarbonate, polyester resin, polyphenylene oxide, polyolefin, polyimide, silicone, Teflon, aramid fiber, glass fiber, ultra-high molecular-weight polyethylene (UHMWPE) fiber and polybenzoxazole (PBO) fiber.

9. The battery cell according to claim 4, wherein the metal is one, or two or more kinds of alloys selected from the group consisting of aluminum, copper, SUS, duranium, palladium, platinum, nickel and molybdenum.

10. The battery cell according to claim 9, wherein a surface of the metal is subjected to an organic insulating coating process, or an anodizing treatment process.

11. The battery cell according to claim 4, wherein the needle-shaped conductor guiding part further includes an insulating film which is stretched along the needle-shaped end part of the needle-shaped conductor.

12. The battery cell according to claim 4, wherein the insulating main body has an opening corresponding to the planar shape of the fall-off part, and the insulating main body and the fall-off pattern are combined with each other in a manner that an adhesive is added to an interface between the insulating main body and the fall-off pattern in a state where the fell-off part is inserted into the opening.

13. The battery cell according to claim 4, wherein the insulating main body has an opening corresponding to the planar shape of the fall-off part, and the insulating main body and the fall-off pattern are combined with each other in a manner that interfaces thereof are fused with each other in a state where the fall-off part is inserted into the opening.

14. The battery cell according to claim 4, wherein the insulating main body and the fall-off pattern are integrated with each other in a manner that the insulating main body and the fall-off part are partitioned by a notch or perforation line.

15. The battery cell according to claim 4, wherein the planar shape of the fall-off pattern has a circular shape, an elliptical shape or a polygonal shape.

* * * * *